United States Patent

Obata

[15] 3,683,268
[45] Aug. 8, 1972

[54] BRUSHLESS ROTARY ELECTRIC MACHINE

[72] Inventor: Yoshiyuki Obata, Kobe, Japan
[73] Assignee: Mitsubishi Denki Kabushiki Kaisha, Tokyo, Japan
[22] Filed: Dec. 14, 1970
[21] Appl. No.: 97,513

[30] Foreign Application Priority Data
Dec. 18, 1969 Japan ...................44/101851

[52] U.S. Cl. .........................322/20, 322/28, 322/73
[51] Int. Cl. ..............................................H02p 9/30
[58] Field of Search .......322/20, 28, 59, 73; 310/194

[56] References Cited

UNITED STATES PATENTS

| | | | |
|---|---|---|---|
| 3,401,328 | 9/1968 | Hartung | 322/28 |
| 3,405,347 | 10/1968 | Swift et al. | 322/94 X |
| 760,086 | 5/1904 | Storey | 310/194 X |
| 3,303,410 | 2/1967 | Hoover et al. | 322/59 X |

Primary Examiner—Lewis H. Myers
Assistant Examiner—H. Huberfeld
Attorney—Robert E. Burns and Emmanuel J. Lobato

[57] ABSTRACT

A rotating-field type rotary electric machine is provided on its elongated rotary shaft with a rotor of a rotating armature type a.c. exciter, thyristors and pulse generator, whereby a voltage induced in the rotor of the a.c. exciter is supplied to the rotary field of the rotary electric machine after rectified by the thyristors to become a d.c. exciting current. The d.c. exciting current is controlled by controlling the firing angle of the thyristors by an output pulse from the pulse generator mounted to the rotary shaft.

6 Claims, 3 Drawing Figures

PATENTED AUG 8 1972 3,683,268

BRUSHLESS ROTARY ELECTRIC MACHINE

BACKGROUND OF THE INVENTION

This invention relates to a brushless rotary electric machine, and in particular to improvements in an excitation circuit for rotating-field type brushless rotary electric machines.

In view of increase in reliability, easy maintenance, etc., the excitation circuit for use in hydroelectric generators, turbo-generators or the like is required to be a system not employing such components subject to wear due to friction as commutators, collector rings, brushes, etc. To meet this requirement, there has been proposed the so-called brushless excitation system wherein an a.c. generator is utilized as an exciter to provide an output therefrom for exciting a rotating field winding of the rotary electric machine after it is rectified by a semiconductor rectifier.

More specifically, the brushless excitation system is arranged such that the rotary electric machine of the rotating field type has provided on its elongated rotary shaft driven by a suitable prime mover with an armature winding of an a.c. generator of the rotating armature type which serves as an exciter and a semiconductor rectifier and, on the other hand, the a.c. exciter is provided with a stationary field winding. Thus the armature winding of the a.c. exciter generates an a.c. output voltage which, in turn, rectified by the rectifier to be changed to a d.c. current and supplied to the rotating field winding of the rotary electric machine to excite the same. Therefore the rotatable portion of the rotary electric machine composed of the field winding, the semiconductor rectifier and the armature of the a.c. exciter can be driven without being in mechanical contact with the stationary or non-rotating portion of the machine. Thus, the so-called brushless excitation system free from those components subject to wear such as commutators, collector rings, brushes, etc., can be realized.

With the brushless excitation system of this type, however, when the system is used with a large-sized rotary electric machine, the associated a.c. exciter is inevitably required to have a high capacity, and therefore the filed winding of the a.c. exciter becomes large-sized accordingly. This leads to an inconvenience that the time constant of the field winding becomes high, resulting in decrease in response speed.

In addition, when the rotary electric machine is a generator, the conventional brushless excitation system as above described has another disadvantage. That is, if the load circuit opens when the generator is being driven in its full load state, the internal voltage drop within the generator is reduced to be zero due to the absence of the load current, resulting in a rapid rise of the voltage across the terminals of the generator up to the value of the internally induced voltage. At this time, the automatic voltage regulation system involved serves to reduce the magnitude of excitation of the field winding of the a.c. exciter to be zero, and the internal energy stored in the field winding of the generator is discharged through the semiconductor rectifier. However, the rate of the variation in current upon this discharge is determined depending upon the time constant of the circuit and, therefore, can not exceed the rate of decrease thus determined. Therefore the generator is subjected to a fear of an overvoltage for a certain period of time.

In addition to the above-mentioned overvoltage applied to the generator, the generator is also subjected to another overvoltage derived from increase in speed of the prime mover attendant upon the decrease in load which is very conspicuous in case of a hydroelectric generator. This results in lowering the rate of decrease of the voltage across the terminals of the generator. Therefore the period of time in which the fear of overvoltage which affects not only the generator but also various other circuit elements connected thereto is extended.

SUMMARY OF THE INVENTION

Accordingly, it is an object of the invention to provide a brushless rotary electric machine the field circuit of the associated a.c. exciter of which is increased in its response speed.

It is another object of the invention to provide a brushless rotary electric machine the field winding of which is rapidly reduced in its internal energy thereby to eliminate the fear of overvoltage for the rotary electric machine.

The invention accomplishes the aforesaid objects by the provision of a brushless rotary electric machine comprising an a.c. exciter mounted on the rotary shaft of a rotating-field type rotary electric machine, a plurality of thyristors connected between an output terminal of said a.c. exciter and a field winding of said rotary electric machine, and a pulse generator mounted on said rotary shaft and generating pulse outputs for firing the thyristors, whereby outputs from said rotary electric machine control said pulse generator in terms of the time point whereupon the pulses are generated therefrom to cause said thyristors to serve as rectifiers or inverters.

The a.c. exciter may be excited by a stationary field winding to have a predetermined constant excitation.

The pulse generator may advantageously include a pair of stationary field magnets the field magnetic poles of which are sharp-pointed.

The rotary shaft may advantageously have provided thereon a pilot generator for detecting the phase of the output from the a.c. exciter to utilize the output from said pilot generator to control said pulse generator.

BRIEF DESCRIPTION OF THE DRAWING

The invention will become more readily apparent from the following detailed description taken in conjunction with the accompanying drawing in which.

Throughout the figures the same reference characters designate the identical or corresponding components.

DESCRIPTION OF THE INVENTION

Figure 1:
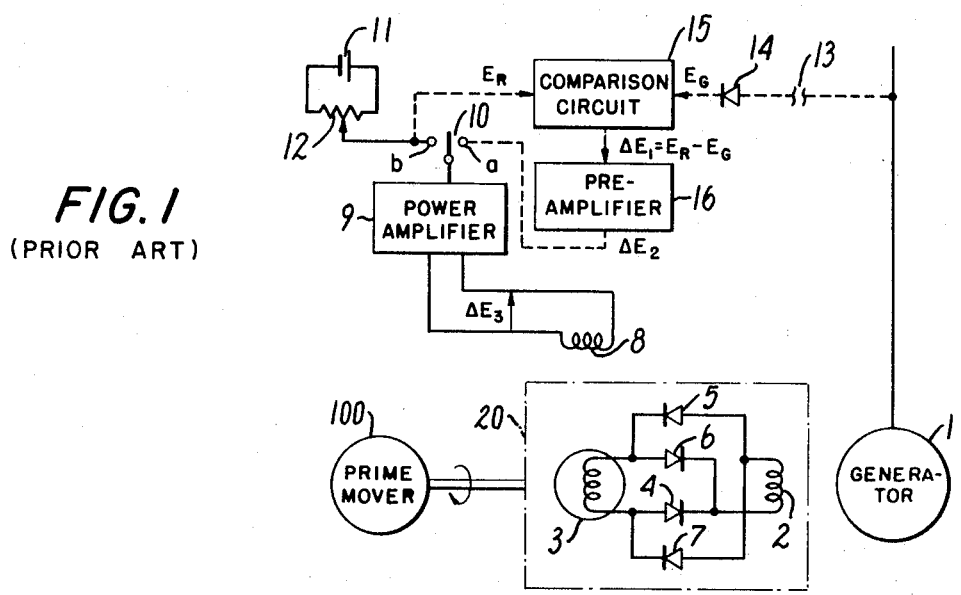
FIG. 1 is a schematic circuit diagram of the conventional brushless rotary electric machine.

Referring now to the drawing and in particular to FIG. 1 thereof, wherein a schematic circuit of a brushless rotary electric machine of the conventional design is illustrated, it is seen that a rotating-field type rotary electric machine illustrated as being a generator 1 comprises a rotating field winding 2 and an a.c. exciter 3 which is illustrated as being a single phase exciter for easy understanding. The a.c. exciter 3 generates an a.c. voltage which, after being rectified through semiconductor rectifiers 4, 5, 6 and 7 to be converted to a d.c. voltage, excited the rotating field winding 2. A prime mover 100 is connected at its rotary shaft to a rotatable portion 20 of the machine illustrated by a dot- and-dash line. The rotatable portion 20 comprises the rotating field winding 2, the a.c. exciter 3 and the semiconductor rectifiers 4 to 7. In order to control the output voltage from the generator 1, there is provided a field winding 8 for the a.c. exciter 3 on the stationary portion of the machine and outside of or apart from the rotatable portion 20, and therefore the output voltage from the generator 1 can be controlled by adjusting the magnitude of the excitation by the stationary field winding 8. The stationary field winding 8 is connected through a power amplifier 9 to a manually operable switch 10 having two terminals $a$ and $b$. When the switch 10 is thrown in the side of the terminal $b$, the output voltage from the generator 1 can be manually controlled, and when the switch 10 is thrown into the side of the terminal $a$, the generator 1 supplies an output voltage automatically controlled to have a predetermined magnitude as will be apparent from the subsequent description. The switch 10 is connected at its terminal $b$ to a source of reference voltage 11 which serves to determine the magnitude of the output voltage from the generator 1 in cooperation with a variable resistor 12 inserted between the source of reference voltage 11 and the terminal $b$ of the switch 10. Therefore, if it is required to manually control the output voltage from the generator 1, the stationary field winding 8 is energized by the source of reference voltage 11 by throwing the switch 10 into the side of the terminal $b$ through the power amplifier 9, the terminal $b$ of the switch 10 and the variable resistor 12. After that, the variable resistor 12 is manually adjusted to control the excitation of the field winding 8, thereby to control the output voltage from the generator 1 to a desired value.

On the other hand, if it is desired to automatically control the output voltage from the generator 1 to have a predetermined value, the manually operable switch 10 is thrown into the side of the terminal $a$. This causes the field winding 8, together with the power amplifier 9, to be connected to another circuit shown by dash lines. More specifically, this circuit connects the output line of the generator 1 to the terminal $a$ of the switch 10 through a voltage transformer 13 for transforming the output voltage from the generator 1 to a predetermined value, a rectifier 14, a comparison circuit 15 and a preamplifier 16 connected in series in the named order. The comparison circuit 15 is also connected to the terminal $b$ of the switch 10. It is to be noted that the preamplifier 16 has several well known feed-back functions necessary for performing the automatic control.

Therefore, when the switch 10 is thrown into the side of the terminal $a$, the comparison circuit 15 compares the output voltage $E_G$ supplied through the transformer 13 and the rectifier 14 from the generator 1 with the reference voltage $E_R$ from the source of reference voltage 11 to provide at its output a difference voltage $\Delta E_1$ which is a difference voltage between the voltages $E_R$ and $E_G$, or $\Delta E_1 = E_R - E_G$. The difference voltage $\Delta E_1$ is supplied to the pre-amplifier 16 to be amplified up to $\Delta E_2$. This amplified voltage $\Delta E_2$ is amplified up to $\Delta E_3$ by the power amplifier 9 to excite the field winding 8 for the a.c. exciter 3. Thus the voltages $\Delta E_3$ which is an amplified difference voltage of the voltage $\Delta E_1$ controls the magnitude of excitation of the field winding 8 of the a.c. exciter 3, resulting in maintaining the output voltage from the generator 1 at a predetermined value. It is easily understood that the change in the magnitude of the reference voltage $E_R$ by adjusting the variable resistor 12 causes the output voltage from the generator 1 to be changed to another predetermined value.

The conventional brushless rotating-field type rotary electric machine, however, has two disadvantages as has previously been described. More specifically, one of them is that the field winding 8 of the a.c. exciter 3 is required to be large when it is to be used with a large sized generator 1. This causes an increase in time constant of the winding, resulting in a raise of a problem in the speed characteristics. The other one is that the circuit elements are subjected to a fear of overvoltage for a long time upon opening the load circuit because it takes a long time to consume the internal energy stored in the field winding 2 of the generator 1.

Figure 2:
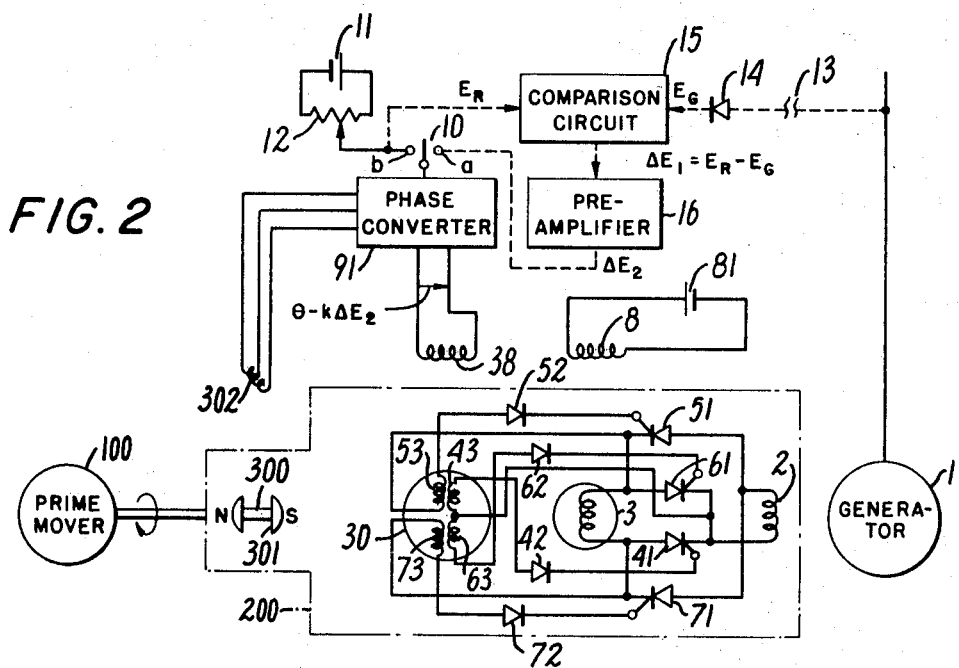
FIG. 2 is a schematic circuit diagram of the brushless rotary electric machine constructed in accordance with the teachings of the present invention.

Referring now to FIG. 2, wherein a brushless rotary electric machine constructed in accordance with the teachings of the invention is illustrated, it is seen that, instead of the semiconductor rectifiers 4, 5, 6 and 7 of FIG. 1, thyristors 41, 51, 61 and 71 are connected between the field winding 2 and the a.c. exciter 3 in order to fullwave-rectify the a.c. voltage generated from the a.c. exciter 3. The gate circuits of the thyristors 41, 51, 61 and 71 are provided with semiconductor rectifiers 42, 52, 62 and 72 respectively, which are, in turn, connected to output windings 43, 53, 63 and 73 of a pulse generator 30 respectively. Therefore the output pulse from the first output winding 43 of the pulse generator 30 is supplied to the gate of the thyristor 41 through the rectifier 42, the output pulse from the second output winding 53 to the gate of the thyristor 51 through the rectifier 52, the output pulse from the third output winding 63 to the gate of the thyristor 61 through the rectifier 62, and the output pulse from the fourth output winding 73 is supplied to the gate of the thyristor 71 through the rectifier 72.

As similar to the device illustrated in FIG. 1, the a.c. exciter 3 is provided with a field winding 8 disposed to the stationary portion of the machine. It is to be noted, however, that the field winding 8 is excited by an electric source 81 of a predetermined constant magnitude. The rotary electric machine is also provided on its stationary portion with another field winding 38 for the pulse generator 30 which is excited by a phase converter 91. It is also seen that the rotary electric machine comprises a permanent magnet generator 300 of the rotating-field type composed of a rotating field magnetic pole 301 of permanent magnet and an armature winding 302 disposed on the stationary portion of the machine. The armature winding 302 is connected to the phase converter 91.

A prime mover 100 is connected to a rotatable portion 200 of the machine, which is illustrated as being enclosed by a dot- and-dash line, comprising the field winding 2 of the generator 1, the rotor of the a.c.

exciter 3, the rotor of the pulse generator 30, the permanent magnet 301, the thyristors 41 to 71 and the rectifiers 42 to 72, thereby enabling the rotatable portion 200 to be driven without being in mechanical contact with the stationary portion.

In other respects, the arrangement is the same as that illustrated in FIG. 1.

It is to be noted that the permanent magnet generator 300 serves to generate a voltage having a predetermined phase relation with respect to the output voltage from the a.c. exciter 3, and the output serves as an electric source for the phase converter 91. The phase relation between the voltage on the armature winding 301 and of the permanent magnet generator 300 and the output voltage from a.c. exciter 3 is arranged so that the former is in advance by an electric angle of 30° – 60° with respect to that of the a.c. exciter 3 because it is generally convenient to control the gate circuit of a thyristor by a voltage exhibiting a phase advanced by an angle of 30° – 60° with respect to the voltage at its anode.

As easily understood from the foregoing description, although the invention has been described in terms of the rotary electric machine employing a permanent magnet generator for convenience purpose, this permanent magnet generator can be replaced by a suitable pilot generator capable of detecting the phase of the output voltage from the a.c. exciter 3.

The field winding 38 of the pulse generator 30 is energized by a pulse output having a phase corresponding to the magnitude of the input voltage $\Delta E_2$ to the phase converter 91 which is driven by an output from the permanent magnet generator 300. The phase converter 91 may comprise an iron core exhibiting a rectangular characteristic of high performance provided with an a.c. primary winding connected to the driving source, a d.c. bias winding to which a d.c. input voltage $\Delta E_2$ is applied, and a secondary winding from which a pulse output is supplied. Therefore, when the d.c. bias voltage $\Delta E_2$ applied to the d.c. bias winding of the phase converter 91 varies, the secondary winding supplies a pulse output in such a waveform having peaks and exhibiting a phase corresponding to the magnitude of the bias voltage.

It is understood that the above means for obtaining a pulse output having a phase variable in accordance with the magnitude of the d.c. input voltage $\Delta E_2$ may be replaced by another arrangement. However, this arrangement does not compose the invention, and therefore the further description thereof is omitted.

The phase converter 91 supplies a pulse output having a phase delayed by an amount expressed by the following equations in accordance with the value of the d.c. input voltage $\Delta E_2$:

$$\theta = \theta_o - \Delta\theta \quad (1)$$

$$\Delta\theta = k \cdot \Delta E_2 \quad (2)$$

where, $\theta$ is a delayed angle with respect to the anode voltage of the thyristors 41, 51, 61 and 71 or the output voltage from the a.c. exciter 3, and $\theta_o$ is a delayed angle when the relationship $\Delta E_2 = 0$ is held.

Figure 3:
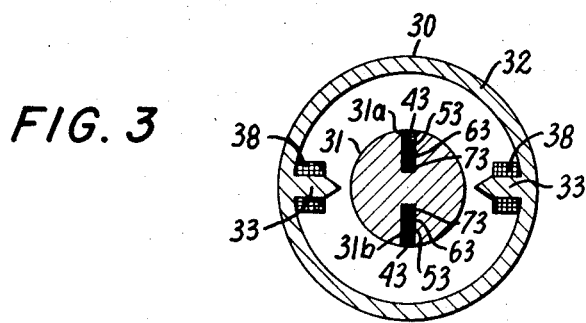
FIG. 3 is a sectional view showing a part of the pulse generator used in the device shown in FIG. 2.

Referring now to FIG. 3, wherein that portion of the pulse generator 30 producing pulses used in the rotary electric machine shown in FIG. 2 is illustrated in section, it is seen that the pulse generator 30 comprises an armature core 31 having formed thereon two diametrically opposing longitudinal narrow grooves 31a and b in which the output windings 43, 53, 63 and 73 in the form of a loop are to be snugly fitted. The armature core 31 is encircled by a yoke 32 integrally having inside thereof two diametrically opposing field poles 33. Each of the field poles 33 is provided on its cylindrical surface with the field winding 38. It is to be noted that each of the field poles 33 has a sharp-pointed end toward the armature core 31 for the purpose of establishing a very fine magnetic flux across both the sharp-pointed ends of the poles 33. The armature core 31, the yoke 32 and the field poles 33 are formed of laminated iron sheets made of suitable material exhibiting a high permeability such as Hypernick (Trade Mark). Under these circumstances, when the field windings 38 wound on the field poles 33 are energized by pulses, the magnetic flux flows from the sharp-pointed end of one of the field poles 33 to the other passing through the plane including the output winding 43, 53, 63 and 73. This causes the respective output windings 43 to 73 to generate output voltage in the form of pulses as in the well known manner. It is to be understood that, because the field poles 33 have the sharp-pointed ends opposing to each other and therefore the magnetic flux established therebetween is substantially of very fine single flux, the output windings 43, 53, 63 and 73 supply output voltages therefrom when the field winding 38 are being energized.

The pulse voltages thus supplied from the respective output windings 43, 53, 63 and 73 are applied to the gate electrodes of the thyristors 41, 51, 61, and 71 through the rectifiers 42, 52, 62 and 72 respectively. Therefore when the pulse is applied, only the thyristor that has a positive electric potential at its anode with respect to that of its cathode is fired. In other words, the thyristors 41, 51, 61 and 71 are fired in accordance with the phase relationships between the anode voltages and the applied pulse voltages.

Assuming that the switch 10 is thrown to the side of the terminal $a$ for automatic control, and that the output voltage from the generator 1 is decreased for any reason, then the voltages $\Delta E_1$ and $\Delta E_2$ become positive values because of the comparison circuit 15 which is so arranged, the delayed angle $\theta$ becomes smaller than the angle $\theta_o$ causing the thyristors 41, 51, 61 and 71 to fire at an earlier time point than the initial firing point. This results in increase in the current supplied to the field winding 2.

On the contrary, if the output voltage from the generator 1 increases for any other reason, then the voltages $\Delta E_1$ and $\Delta E_2$ become negative values due to the comparison circuit 15. Therefore, the delayed angle $\theta$ becomes larger than the angle $\theta_o$, causing the firing time points of the thyristors 41, 51, 61 and 71 to delay than those of the initial state. Therefore, the current supplied to the field winding 2 is reduced, or the internally stored energy in the field winding is absorbed by the a.c. exciter 3 passing through the thyristors which are changed in their function to be inverters.

Generally, the d.c. voltage $E_d$ obtained from the applied voltage E and the firing angle (Positive sign depicts a delayed angle) is expressed by the following equation:

$$E_d = (2/\pi) \sqrt{2}E \sin(\pi/p) \cos\theta \quad (3)$$

where, $p$ is number of phases. Therefore, the d.c. voltage $E_d$ is positive when $$0 < \theta < (\pi/2) \quad (4)$$

is held, and negative when $$(\pi/2) < \theta < \pi \quad (5)$$

is held. From the Equations (4) and (5) it is understood that the thyristors 41, 51, 61 and 71 serve as rectifiers or as inverters in accordance with the polarity of the firing angle $\theta$.

Therefore, when the pulse generator 30 is arranged such that the pulse voltage generated from the output windings 43, 53, 63 and 73 of the pulse generator 30 is proportional in its phase angle $\theta$ with respect to the magnitude of the voltage across the anode of the respective thyristors 41, 51, 61 and 71, or more specifically, advance when the voltage $\Delta E_1$ is positive and delay when the voltage $\Delta E_1$ is negative with respect to the value of $(\pi/2)$, then each of the thyristors 41, 51, 61 and 71 can be used either as rectifiers or inverters in accordance with the polarity of the electric quantity $\Delta E_1$.

Although when the thyristors 41, 51, 61 and 71 are serving as inverters the machine system is to be accelerated by the a.c. exciter 3 serving as an electric motor which absorbs the internally stored energy in the field winding 2, the machine system can never actually be accelerated owing to a massive inertia of the system.

In summary, the relations as heretofore described are expressed by the following equations by referring back to the voltage variation $\Delta E_1$:

$(+\Delta E_1) \rightarrow (+\Delta\theta) \rightarrow \theta$ advanced than $(\pi/2)$ rectifiers $(\Delta E_1 = 0) \rightarrow (\Delta\theta = 0) \rightarrow \theta = (\pi/2)$ neutral $(-\Delta_1) \rightarrow (-\Delta\theta) \rightarrow \theta$ delayed than $(\pi/2)$ inverters.

It is to be understood that the comparison circuit 15 is so arranged as to generate a certain magnitude of the voltage $+\Delta E_1$ even when the rotary electric machine is being driven under a constant state. This is because the rotating field winding 2 is required to be excited by a necessary extent during the constant driving of the rotary electric machine.

Although the invention has been described in terms of a rotary electric machine of single phase type, it is easily understood that the invention is equally applicable to a rotary electric machine for use with polyphase system without departing from the scope and the spirit of the invention.

What I claim is:

1. A brushless rotary electric machine comprising an a.c. exciter mounted to a rotary shaft of a rotating-field type rotary electric machine, said exciter having a stationary field winding providing selected constant excitation, a plurality of thyristors connected between an output terminal of said a.c. exciter and a field winding of said rotary electric machine, and a pulse generator mounted to said rotary shaft and generating pulse outputs for firing the thyristors, whereby outputs from said rotary electric machine control said pulse generator in terms of the time point whereupon the pulses are generated therefrom to cause said thyristors to serve as rectifiers or inverters.

2. A brushless rotary electric machine as claimed in claim 1, wherein said pulse generator comprises a pair of stationary field magnets the field magnetic poles of which are sharp-pointed.

3. A brushless rotary electric machine as claimed in claim 1, wherein said rotary shaft has provided thereon a pilot generator for detecting the phase of the output from the a.c. exciter to utilize the output from said pilot generator to control said pulse generator.

4. A brushless rotary machine as claimed in claim 1, wherein said pulse generator comprises armature windings mounted on said rotary shaft and stationary field windings.

5. A brushless rotary machine as claimed in claim 4, wherein said field windings of said pulse generator are excited by a permanent magnet generator comprising a stationary winding and a permanent magnet rotating with said rotary shaft.

6. A brushless rotary machine as claimed in claim 5, wherein said field windings of said pulse generator are connected with said winding of said permanent magnet generator through a phase converter the phase conversion angle of which varies with the output voltage of said rotary machine.

* * * * *